United States Patent [19]
Harmon et al.

[11] 3,923,780
[45] Dec. 2, 1975

[54] 4-(SUBSTITUTED AZOBENZENESULFONAMIDES AS FASCIOLICIDES

[75] Inventors: Robert E. Harmon, Kalamazoo, Mich.; Helmut H. Mrozik, Matawan, N.J.

[73] Assignee: Merck & Co., Inc., Rahway, N.J.

[22] Filed: Oct. 23, 1973

[21] Appl. No.: 408,693

[52] U.S. Cl. .................. 260/207; 119/51; 424/226; 260/141; 260/154; 260/155; 260/156; 260/157; 260/185; 260/205; 260/206; 260/207.1; 260/556 AR

[51] Int. Cl.$^2$.................. A01N 23/00; A61K 3/655; C07C 107/06; C07C 107/08

[58] Field of Search ........ 260/205, 207.1, 207, 197, 260/202, 184, 185

[56] References Cited

UNITED STATES PATENTS

| | | | |
|---|---|---|---|
| 1,950,952 | 3/1934 | Rechard | 260/185 |
| 2,231,021 | 2/1941 | McNally et al. | 260/205 |
| 2,955,901 | 10/1960 | Kruckenberg | 260/265 X |
| 3,050,516 | 8/1962 | Merian et al. | 260/205 |
| 3,134,766 | 5/1964 | Merian et al. | 260/186 |
| 3,600,377 | 8/1971 | Stingl | 260/200 |

FOREIGN PATENTS OR APPLICATIONS

| | | | |
|---|---|---|---|
| 42-3177 | 2/1967 | Japan | 260/205 |

OTHER PUBLICATIONS

Guha-Sircar et al., Chemical Abstracts, Vol. 45, 9803–9804 (1951).

Ingle et al., Chemical Abstracts, Vol. 43, 9047–9048 (1949).

*Primary Examiner*—Floyd D. Higel
*Attorney, Agent, or Firm*—J. Jerome Behan; David L. Rose

[57] ABSTRACT

Novel substituted azobenzenesulfonamides are useful as agents for the treatment of both mature and immature liver fluke infections. The azobenzenesulfonamide is substituted on the benzene ring with halogen. The azo substituents are aromatic hdyrocarbons such as phenyl or naphthyl, aromatic heterocycles such as pyridine, triazole and quinoline, aliphatic heterocycles such as imidazoline and pyrimidine trione and aliphatic esters which in turn may be substituted with hydroxyl, amino, loweralkyl, carboxy, hydrazino, nitrile, or ureido. Compositions containing these compounds for the treatment of mature and immature liver fluke infections are also disclosed.

2 Claims, No Drawings

4-(SUBSTITUTED AZOBENZENESULFONAMIDES AS FASCIOLICIDES

SUMMARY OF THE INVENTION

This invention relates to novel azosulfonamides and methods for their preparation. In particular, this invention relates to novel 4-substituted azo-3,5-dihalobenzenesulfonamide. These novel compounds have antiparasitic and anthelmintic activity and are particularly active against liver fluke in sheep and cattle. It is thus an object of this invention to provide novel azobenzenesulfonamides. It is also an object to provide processes for the preparation of said compounds. A further object shall be the use of said novel compounds in compositions which are useful for the treatment and prevention of helminthic infections, particularly fascioliasis. Further objects will be apparent with a complete reading of this specification.

The novel azobenzenesulfonamides are represented by the following structural formula:

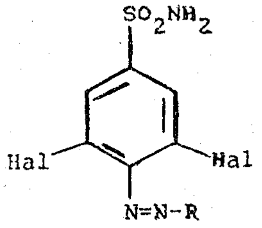

wherein each Hal is a halogen which may be any of the halogens fluorine, chlorine, bromine, or iodine. R is an aromatic hydrocarbon, an aromatic heterocycle, a non-aromatic heterocycle, an aliphatic ester, or a substituted loweralkyl. The foregoing groups may in turn be substituted with hydroxyl, amino, loweralkylphenyl, carboxy, hydrazino, cyano, ureido, or phenylazo.

The aromatic hydrocarbon groups are represented by those containing from 6 to 10 carbon atoms particularly benzene and napthalene. The preferred aromatic hydrocarbon substituent groups are hydroxy, loweralkyl, amino, and ureido. The 2,4-dihydroxy-5-loweralkylphenyl, 2-amino-4,5-diloweralkylphenyl, and 4-hydroxy-2-ureidophenyl substituents are of particular merit. In addition, the aromatic bis compound 1,8-bis-(2,6-dibromo-4-sulfonylphenylazo)-2,7-dihydroxy naphthalene is also meritorious.

The aromatic heterocyclic groups are represented by 5 and 6 membered single heterocycles containing from 1 to 3 nitrogen atoms and fused ring systems with one nitrogen heteroatom, said fused rings having no more than 10 ring atoms. Preferred aromatic heterocycles are pyridine, triazole, and quinoline. The preferred substituents on the aromatic heterocycles are hydroxy, carboxy, amino, hydrazino, loweralkyl, and phenylazo.

The non-aromatic heterocyclic groups are represented by five and six membered heterocyclic rings containing one or two nitrogen heteroatoms. Exemplary of the foregoing are imidazolinone and pyrimidine-trione. The foregoing rings may be optionally substituted with loweralkyl or phenyl.

The loweralkyl esters are represented by those esters derived from carboxylic acids containing from 2 to 4 carbon atoms, and aliphatic alcohols containing from 1 to 4 carbon atoms. The esters may optionally be substituted on the carboxylic portion with a nitrile group. The substituted loweralkyl groups are preferably a methyl group substituted by one or more cyano groups.

The above novel compounds are useful as antiparasitic and anthelmintic agents. They are preferably employed in the treatment of liver fluke in sheep and cattle and when so employed are combined with non-toxic carriers for either oral or parenteral use. These compositions and their method of use in treating liver fluke infections thus form other aspects of the invention.

PREFERRED EMBODIMENTS OF THE INVENTION

The preferred aspects of this invention are those compounds of Formula I above where Hal is bromine. Exemplary compounds are listed hereinbelow. The list is merely indicative of the preferred embodiments of this invention and should not be construed as limitative of this invention.

3,5-Dibromo-4-(7-carboxy-8-hydroxy-5-quinolinylazo)-benzenesulfonamide
3,5-Dibromo-4-(4-amino-3-hydrazino-1,2,4-triazol-5-ylazo)-benzenesulfonamide
3,5-Dibromo-4-(8-hydroxy-5-quinolinylazo)-benzenesulfonamide
3,5-Dibromo-4-(2,4-dihydroxy-5-hexyl phenylazo)-benzenesulfonamide
Ethyl-(3,5-dibromo-4-sulfamoyl phenylazo)-2-cyanoacetate
3,5-Dibromo-4-(5-hydroxy-3-methyl-1-phenyl-4-imidazolylazo)-benzenesulfonamide
3,5-Dibromo-4-(2,6-diamino-3-phenylazo-5-pyridinylazo)-benzenesulfonamide
3,5-Dibromo-4-(4-hydroxy-2-ureidophenylazo)-benzenesulfonamide
3,5-Dibromo-4-(2-amino-4,5-dimethylphenylazo)-benzenesulfonamide
1,8-Bis(3,5-dibromo-4-sulfamoylphenylazo)-2,7-dihydroxy napthalene
5-(3,5-Dibromo-4-sulfamoylphenylazo)-2,4,6-trihydroxy pyrimidine The azobenzenesulfonamides of this invention are prepared by diazotizing a 4-amino-3,5-dihalobenzenesulfonamide and treating the resulting diazonium salt with R—H wherein R is defined as above. The following reaction scheme is illustrative:

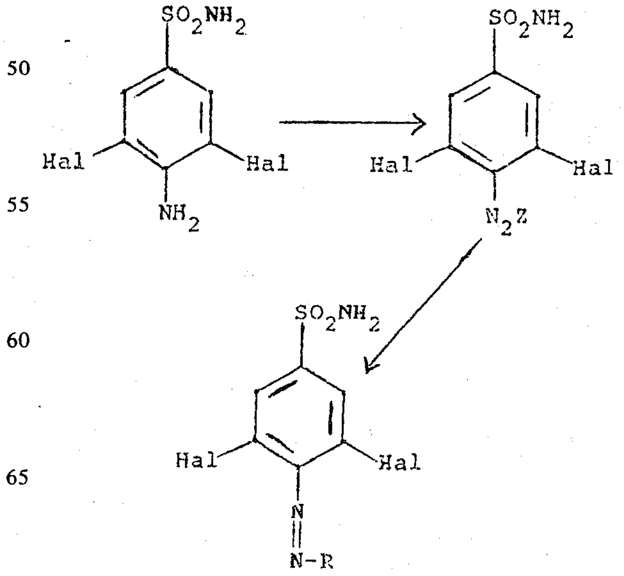

wherein R is as previously defined. Z is the anion of the acid used in the diazotization of the starting material. Sulfuric, phosphoric, nitric, and hydrochloric acids have been employed; thus Z is sulfate, phosphate, nitrate, or chloride. Hydrochloric acid is the preferred acid and chloride is the preferred anion Z.

The diazotization step is carried out at from 0–5°C. using an alkali metal nitrite, usually sodium nitrite, and one of the aforementioned acids, usually hydrochloric acid. The diazonium salt being unstable is generally not isolated but is used in situ in solution, or in suspension.

The solution or suspension of the diazonium salt is reacted with the R—H reactant at a temperature of −20° to 20°C. in the presence of an added base such as an alkali metal hydroxide, sodium acetate or trisodium phosphate to aid in the coupling of the diazo group to the R group. The reaction is usually complete in from 10 minutes to 2 hours and the product is then isolated by techniques known to those skilled in this art.

The compounds of the present invention have utility in the field of animal therapy. They are effective anthelmintics and are especially effective against both mature and immature liver fluke of the species *Fasciola gigantica* and *Fasciola hepatica*, the common liver fluke in sheep and cattle. The preferred dosage levels depend on the type of compound to be employed, the type of animal to be treated, the particular helminth to be combatted, and the severity of the helminthic infestation. In general, effective fluke eradication is achieved when the compounds are administered in a single oral dose at dosage levels of from about 1 to 300 mg/kg of animal body weight and preferably from about 10 to 100 mg/kg of animal body weight. The compounds of the present invention may be administered in a variety of ways depending upon the particular animal employed, the type of anthelmintic treatment normally given to such animal, the materials employed and the particular helminths being combatted. It is preferred to administer them in anthelmintically effective amounts in a single or divided oral or parenteral, most preferably oral, dose at a time when fluck infection is apparent or suspected in the animal.

In addition to the inactive ingredients in the composition, said composition may contain one or more other active ingredients which may be selected from the compounds described by formula I or from other known anthelmintic agents. Beneficial results are obtained when the compounds of formula I are combined with an anthelmintic agent such as 2-(4-thiazolyl)-benzimidazole (thiabendazole) or tetramisole (dl--2,3,5,6-tetrahydro-6-phenylimidazo[2,1-b]thiazole) known anthelmintic agents.

In general, compositions containing the active anthelmintic compound are employed. The amounts of the anthelmintic ingredient in the composition as well as the remaining constituents vary according to the type of treatment to be employed, the host animal and the particular helmintic infestation being treated. In general, however, compositions suitable for oral administration, containing a total weight percent of the active compound or compounds ranging from 0.01 to 95 percent will be suitable with the remainder of the compositions being any suitable carrier or vehicle. A number of modes of treatment may be employed and each to some extent determines the general nature of the composition. For example, the anthelmintic compounds may be administered to domesticated animals in a unitary oral dosage form such as a tablet, bolus, capsule, or drench; a liquid oil base form suitable for parenteral administration, or they may be compounded as a feed premix to be later admixed with the animals food. When the compositions are to be solid unit dosage forms as in tablets, capsules or boluses, the ingredients other than the active compounds may be any other non-toxic vehicle convenient in the preparation of such forms and preferably materials nutritionally suitable such as starch, lactose, talc, magnesium stearate, vegetable gums and the like. Moreover, when capsules are employed, the active compound may be used in essentially undiluted form, the only extraneous material being that of the capsule casing itself which may be hard or soft gelatin or any other orally acceptable encapsulating material. When the dosage form is to be used for parenteral administration the active material is suitably admixed with an acceptable oil base vehicle preferably of the vegetable oil variety such as peanut oil, cotton seed oil and the like. In all such forms, that is, in tablets, boluses, capsules and oil base formulations, the active compound convenient ranges from about 5 to 95 percent by weight of the total composition.

When the unit dosage form is to be in the form of a drench, the anthelmintic agents may be mixed with agents which will aid in the subsequent suspending of the active compounds in water such as bentonite, clays, water soluble starches, cellulose derivatives, gums, surface active agents and the like to form a dry pre-drench composition, and this pre-drench composition is added to water just before use. In the pre-drench formulation, in addition to the suspending agent, such ingredients as preservatives, anti-foam compounds or other suitable diluents or solvents may be employed. Such a dry product may contain as much as 95 percent by weight of the active compound, the rest being excipient. Preferably, the solid composition contains from 30 to 95 percent by weight of the active compound. Enough water should be added to the solid product to provide the proper dosage level with a convenient amount of liquid for a single oral dose. The commonly used measure in the field is 1 fluid ounce of material and thus that 1 fluid ounce of material should contain enough of the anthelmintic compound to provide an effective dosage level. Liquid drench formulations containing from 10 to 50 percent by weight of dry ingredients will in general be suitable with a preferred range being from 15 to 25 weight percent.

When the compositions are intended to be used in feeds, feed supplements, or feed premixes, they will be mixed with suitable ingredients of the animals nutrient ration. Solid orally ingestible carriers normally used for such purposes such as distillers dried grains, corn meal, citrus meal, fermentation residues, attapulgus clay, wheat shorts, molasses solubles, corn cob meal, vegetable substances, toasted dehulled soya flour, soya bean meal feed, antibiotic mycellia, soya grits, crushed limestone and the like are all suitable. The active compounds are intimately dispersed or admixed throughout the active solid carrier by methods such as grinding, melting, or tumbling. By selecting a proper diluent and by altering the ratio of carrier to active ingredient, compositions of any desired concentration may be prepared. Feed supplement formulations containing from about 5 to 30 percent of active ingredient are particularly suitable for addition to feeds. The active compound is normally dispersed or mixed uniformly in the diluent but in some instances may be absorbed on the carrier.

These supplements are added to the finished animal feed in an amount adequate to give the final concentration desired for controlling or treating the helminth infection by way of animal ration. Although the preferred level in feeds will depend on the particular compounds being employed, the active compounds of this invention are normally fed at levels of 0.01 to 3%. As stated above, animals are preferably treated at a time when the infestation is apparent or suspected and the most preferred method of such treatment is with oral doses. Thus, administration of medicated feed is not preferred but may be employed. Similarly, the amounts of drug present in the feed may be reduced to levels in the order of 0.01 to 0.05 percent by weight, based on the weight of the feed and the medicated feed administered over prolonged periods. This could be in the nature of a preventive or prophylactic measure. Another method of administering the compounds of this invention to animals whose feeds are conveniently pelleted such as sheep is to incorporate them directly into the pellets. For instance, the anthelmintic compounds are readily incorporated in the nutritionally adequate alfafa pellets at levels of 2 to 10 g. per pound for therapeutic use and lower levels for prophylactic use, and such pellets fed to the animals.

Examples of compositions suitable for administration to animals are:

A typical bolus composition is as follows:

| | |
|---|---|
| 3,5-Dibromo-4-(4-hydroxy-2-ureidophenylazo)-benzenesulfonamide | 6.0 g. |
| dicalcium phosphate | 1.0 g. |
| starch | 0.7 g. |
| guar gum | 0.16 g. |
| talc | 0.11 g. |
| magnesium stearate | 0.028 g. |

A typical drench composition is as follows:

| | |
|---|---|
| 3,5-Dibromo-4-(1-amino-5-hydrazino-2-triazolylazo)-benzenesulfonamide | 5.0 g. |
| benzalkonium chloride | 0.6 ml. |
| antifoam emulsion | 0.06 g. |
| hydroxyethyl cellulose | 0.3 g. |
| sodium phosphate | 0.3 ml. |
| water | g.s. to 30 ml. |

Examples of typical feed premix supplements are as follows:

| | | |
|---|---|---|
| A. | 3,5-Dibromo-4-(7-carboxy-8-hydroxy-5-quinolinylazo)-benzenesulfonamide | 10 lbs. |
| | Wheat shorts | 90 lbs. |
| B. | 3,5-Dibromo-4-(2,6-diamino-3-phenylaze-5-pyridinylazo)-benzenesulfonamide | 15 lbs. |
| | Ground oyster shells | 40 lbs. |
| | Citrus meal | 45 lbs. |

The above feed premix supplements are combined with the animals regular feed, intimately mixing therewith such that the final concentration of the active ingredient is from 0.01 to 3 percent by weight.

The following examples are typical of the procedure employed to synthesize the compounds of this invention. The examples are presented in order that the invention may be more fully understood. They should not be construed as limitative of the invention.

EXAMPLE 1

3,5-Dibromo-4-(7-Carboxy-8-Hydroxy-5-Quinolinylazo)-Benzenesulfonamide

20 Ml. of 2N hydrochloric acid is combined with 6.6 g. (0.02 moles) of 3,5-dibromosulfanilamide and the suspension cooled to 0°C. It is diazotized with 1.4 g. (0.02 moles) of sodium nitrite in 30 ml. of water at a temperature of 0°–5°C. over a period of 30 minutes with vigorous stirring. A separate solution of 3.78 g. (0.02 moles) of 7-carboxy-8-hydroxy-quinoline in 52 ml. of 5N sodium hydroxide is prepared and cooled to 0°C. The diazonium salt solution is added in one portion to the 7-carboxy-8-hydroxy-quinoline solution with vigorous stirring. The solution is allowed to come to room temperature and the pH adjusted to from 3 to 4 with 50% acetic acid whereupon the crude product precipitates. The suspension is allowed to stand at room temperature for 2 hours, filtered, and dried affording 9.1 g. of 3,5-dibromo-4-(7-carboxy-8-hydroxy-5-quinolinylazo)-benzenesulfonamide, m.p. 262°–264°C.

EXAMPLE 2

3,5-Dibromo-4-(4-Amino-3-Hydrazino-1,2,4-Triazol-5Ylazo)-Benzensulfonamide

Following the procedure of Example 1, 2.9 g. (0.02 moles) of 1-amino-2-hydrazino-5-mercapto-1,3,4-triazole is combined with 6.6 g. (0.02 moles) of 3,5-dibromosulfaniliamide affording 6.4 g. (70 percent yield) of 3,5-dibromo-4-(4-amino-3-hydrazino-1,2,5-triazol-5-ylazo)-benzenesulfonamide m.p. 192°–195°C.

EXAMPLE 3

Ethyl-(3,5-Dibromo-4-Sulfamoylphenylazo)-2-Cyanoacetate 2.26 G. (0.02 moles) of ethylcyano acetate is dissolved in 800 ml. of ethanol containing 45 g. of sodium hydroxide and cooled to 0°C. 6.6G (0.02 moles) of 3,5-dibromosulfanilamide is dissolved in 20 ml. of hydrochloric acid and 30 ml. of glacial acetic acid and cooled to 0°C.. The latter solution is diazotized with 1.4 g. (0.02 moles) of sodium nitrite in 10 ml. of water over a 15 minute period. When the diazotization is completed the resultant diazonium salt solution at 0°C is added in 1 portion to the basic ethanol solution with vigorous stirring. The resultant solution is made acidic with 50% aqueous acetic acid to a pH of 3 to 4. The precipitated product is collected by filtration and dried affording 7.4 g. (82 percent yield) of ethyl-(3,5-dibromo-4-sulfamoylphenylazo)-2-cyanoacetate, m.p. 216°–218°C.

EXAMPLE 4

4-(2-Amino-4,5-Dimethylphenylazo)-3,5-Dibromobenzenesulfonamide 0.025 Moles of 3,5-dibromosulfanilamide is mixed with 40 ml. of glacial acetic acid and 15 ml. of concentrated hydrochloric acid. The slurry is cooled to 0°C. and an aqueous solution of 1.5 g. of sodium nitrite in 10 ml. of water is added at 0°–5°C.

The reaction mixture is filtered maintaining the temperature at 0°–5°C. To the diazonium salt solution is added a solution of 0.025 moles of 3,5-dimethyl aniline in 50 ml. of 1N sodium hydroxide maintaining the temperature at 0°–5°C. The product precipitates and is filtered, washed with water, and dried in a vacuum oven affording 4-(2-amino-4,5-dimethylphenylazo)-3,5-dibromobenzenesulfonamide.

EXAMPLE 5

4-(3-Hydroxypyridylazo)-3,5-Dibromobenzenesulfonamide 0.025 Moles of 3,5-dibromosulfanilamide is mixed with 40 ml. of glacial acetic acid and 15 ml. of concentrated hydrochloric acid. The slurry is cooled to 0°C. and an aqueous solution of 1.5 g. of sodium nitrite in 10 ml. of water is added at 0°–5°C.

The diazonium salt solution is filtered at 0°–5°C. and combined with an aqueous solution of 0.025 moles of 3-hydroxypyridine in 50 ml. of 1N sodium hydroxide. The product precipitates and is filtered, washed with water, and dried in a vacuum oven affording 4-(3-hydroxypyridylazo)-3,5-dibromobenzenesulfonamide.

EXAMPLE 6

4-(Dicyanomethylazo)-3,5-Dibromobenzenesulfonamide 0.025 Moles of 3,5-dibromosulfanilamide is mixed with 40 ml. of glacial acetic acid and 15 ml. of concentrated hydrochloric acid. The slurry is cooled to 0°C. and an aqueous solution of 1.5 g. of sodium nitrite in 10 ml. of water is added at 0°–5°C.

The unreacted 3,5-dibromosulfanilamide is removed by vacuum filtration at 0°–5°C. and the diazonium salt solution is combined with 0.025 moles of malononitrile in 50 ml. of 1N sodium hydroxide. The product precipitates and is filtered, washed with water, and dried in a vacuum oven affording 4-(dicyanomethylazo)-3,5-dibromobenzenesulfonamide

EXAMPLE 7

1,8-Bis-(2,6-Dibromo-4-sulfonylphenylazo)-2,7-Dihydroxynapthalene 0.025 Moles of 3,5-dibromosulfanilamide is mixed with 40 ml. of glacial acetic acid and 15 ml. of concentrated hydrochloric acid. The slurry is cooled to 0°C. and an aqueous solution of 1.5 g. of sodium nitrite in 10 ml. of water is added at 0°–5°C.

The unreacted 3,5-dibromosulfanilamide is removed by vacuum filtration at 0°–5°C. and the diazonium salt solution combined with 0.0125 moles of 2,7-dihydroxynapthalene in 50 ml. of 1N sodium hydroxide. The product precipitates and is filtered, washed with water, and dried affording 1,8-Bis-(2,7-dibromo-4-sulfonylphenylazo)-2,7-dihydroxynapthalene.

EXAMPLE 8

1-Phenyl-3-Methyl-4-(2,6-Dibromo-4-Sulfonylphenylazo)-5-Hydroxypyrazole 0.025 Moles of 3,5-dibromosulfanilamide is mixed with 40 ml. of glacial acetic acid and 15 ml. of concentrated hydrochloric acid. The slurry is cooled to 0°C. and an aqueous solution of 1.5 g. of sodium nitrite in 10 ml. of water is added at 0°–5°C.

The unreacted 3,5-dibromosulfanilamide is removed by vacuum filtration at 0°–5°C. and the diazonium salt solution combined with 0.025 moles of 1-phenyl-3-methyl-5-hydroxypyrazole in 50 ml. of 1N sodium hydroxide. The product precipitates and is filtered, washed with water, and dried affording 1-phenyl-3-methyl-4-(2,6-dibromo-4-sulfonylphenylazo)-5-hydroxypyrazole in 74 percent yield m.p. 180°–182°C.

EXAMPLE 9

4-[1,3-Dihydroxy-4-(n-hexyl)-phenylazo]-3,5-Dibromosulfonamide 0.025 Moles of 3,5-dibromosulfanilamide is mixed with 40 ml. of glacial acetic acid and 15 ml. of concentrated hydrochloric acid. The slurry is cooled to 0°C. and an aqueous solution of 1.5 g. of sodium nitrite in 10 ml. of water is added at 0°–5°C.

The unreacted 3,5-dibromosulfanilamide is removed by vacuum filtration at 0°–5°C. and the diazonium salt solution combined with 0.025 moles of 4-(n-hexyl) resorcinol in 50 ml. of 1N sodium hydroxide. The product precipitates and is filtered, washed with water, and dried affording 4-[1,3-dihydroxy-4-(n-hexyl)-phenylazo]-3,5-dibromosulfonamide in 80 percent yield m.p. 215°–217°C.

EXAMPLE 10

4-(2,6-Diamino-3-Phenylazo-5-Pyridylazo)-3,5-Dibromobenzenesulfonamide 0.025 Moles of 3,5-dibromosulfanilamide is mixed with 40 ml. of glacial acetic acid and 15 ml. of concentrated hydrochloric acid. The slurry is cooled to 0°C. and an ageuous solution of 1.5 g. of sodium nitrite in 10 ml. of water is added at 0°–5°C.

The unreacted 3,5-dibromosulfanilamide is removed by vacuum filtration at 0°–5°C. and the diazonium salt solution combined with 0.025 moles of 2,6-diamino-3-phenylazo pyridine in 1N sodium hydroxide. The product precipitates and is filtered, washed with water, and dried affording 4-(2,6-diamino-3-phenylazo-5-pyridylazo)-3,5-dibromobenenesulfonamide in 85 percent yield m.p. 263°–265°C.

What is claimed is:

1. A compound having the formula:

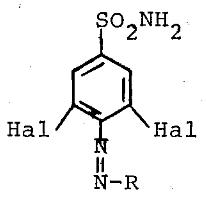

wherein Hal is fluorine, chlorine, bromine or iodine; and R is phenyl or naphthyl substituted with hydroxy and

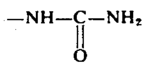

2. A compound of claim 1 which is 3,5-dibromo-4-(4-hydroxy-2-ureidophenylazo)-benzenesulfonamide.

* * * * *